United States Patent [19]

Gage et al.

[11] 4,295,013
[45] Oct. 13, 1981

[54] IGNITION SWITCH

[75] Inventors: Millard E. Gage, Otego; Derek J. Landers, Sidney Center, both of N.Y.

[73] Assignee: The Bendix Corporation, Southfield, Mich.

[21] Appl. No.: 149,108

[22] Filed: May 12, 1980

[51] Int. Cl.³ .......................................... H01H 21/62
[52] U.S. Cl. ................................................ 200/11 C
[58] Field of Search ................ 200/11 C, 11 G, 11 J, 200/44, 29

[56] References Cited

U.S. PATENT DOCUMENTS

| 2,033,252 | 3/1936 | Parker | 200/11 C |
| 2,053,948 | 9/1936 | Edwards | 200/11 C |
| 2,663,780 | 12/1953 | Hept et al. | 200/11 C X |
| 2,763,753 | 9/1956 | Hasselbaum | 200/44 |
| 2,778,891 | 1/1957 | Jacobi | 200/11 C |
| 3,539,737 | 11/1970 | Schupp | 200/11 C |

*Primary Examiner*—James R. Scott
*Attorney, Agent, or Firm*—Raymond J. Eifler

[57] ABSTRACT

The invention is a spring return type aircraft ignition switch characterized by retainer plate (10) that includes a tab (12) that extends between a portion of the coil spring (20) and the wall (65) of the rotor body (60) to prevent the windings from the coil (20) from wedging from between the retainer plate (10) and the rotor body (60).

2 Claims, 5 Drawing Figures

U.S. Patent  Oct. 13, 1981  4,295,013
FIG.1
FIG.2
FIG.3
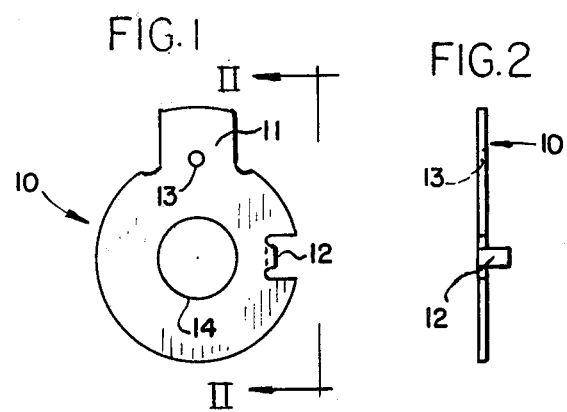
FIG.4
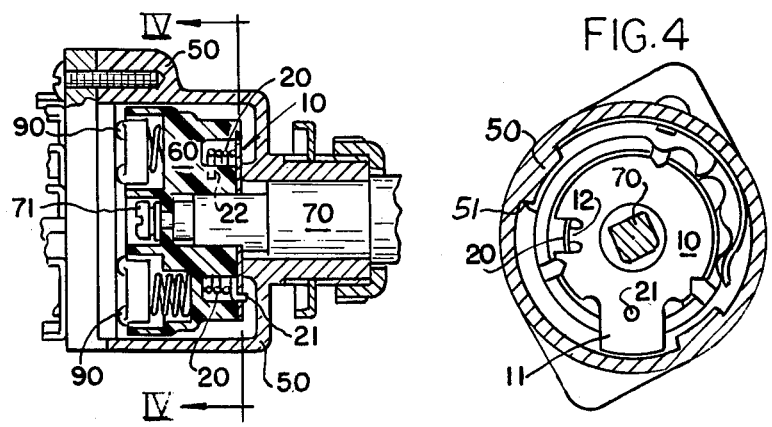
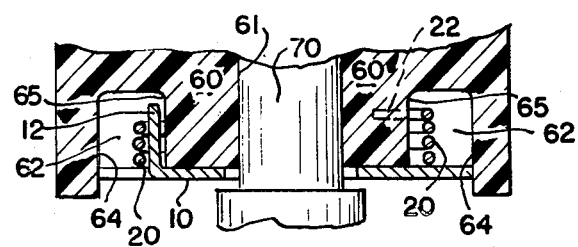
FIG.5

IGNITION SWITCH

This invention relates to spring return electrical switches of the type used for aircraft ignition switches.

BACKGROUND ART

Light aircraft ignition switches are multiposition electrical switches. Examples of such switches may be found in U.S. Pat. Nos. 3,218,401, 3,467,793 and 2,053,948. Some of these switches include a spring that operates to rotate electrical contacts to a previous position, i.e., from START to RUN when the operator removes his hand from the switch. In some instances when the switch is rotated into the START position a portion of the coil spring within the switch would wedge between the spring retainer plate and the rotor assembly causing the switch to remain in the START position. When this occured and the aircraft engine started, the starter motor, which was still engaged would be damaged.

DISCLOSURE OF THE INVENTION

This invention is a spring return type aircraft ignition switch that will not stick or remain in the START position when the operator lets go of the switch.

The invention is a spring return type aircraft ignition switch characterized by a retainer plate (10) that includes a tab (12) that extends between a portion of the coil spring (20) and the wall (65) of the rotor body (60) to prevent the windings from the coil (20) from wedging between the retainer plate (10) and the rotor body (60).

Accordingly, it is the object of this invention to provide an ignition switch that does not remain in the START position when the operator removes his hand from the switch thereby avoiding damage to the starter motor actuated by the switch when the aircraft engine is operating.

BRIEF DESCRIPTION OF THE DRAWINGS

FIG. 1 illustrates the novel spring retainer plate for an ignition switch.

FIG. 2 is a side view of the retainer plate shown in FIG. 1.

FIG. 3 is a cross sectional view of an aircraft ignition switch.

FIG. 4 is a cut-a-way view of the aircraft ignition switch shown in FIG. 3 and taken along lines IV—IV.

FIG. 5 is an enlarged view of a portion of the ignition switch which illustrates the relationship of the retainer plate, the coil spring the rotor assembly and shaft.

BRIEF DESCRIPTION OF THE PREFERRED EMBODIMENT

Referring now to the drawings FIG. 1 illustrates a retainer plate 10. The retainer plate 10 includes an extended portion 11, a tab 12, a small aperture 13 for receiving the end portion of a spring, and a central opening 14 for receiving a rotor shaft.

FIG. 2 is a side view of the retainer plate which illustrates the tab 12 extending at a right angle to the plate of the retainer plate.

FIG. 3 illustrates a cut-a-way view of a multi-position ignition switch. The ignition switch includes: a housing 50; a rotor body 60; spring loaded electrical contacts 90; a retainer plate 10; spring 20; and a means for rotatably mounting the rotor body 60, which includes a central shaft 70 connected to the rotor body 60 by a fastening means such as screw 71. One end 21 of the coil spring 20 is connected to the retainer plate 10 by inserting the end 21 of the coil spring 20 through the hole (13, FIG. 2) in the retainer plate 10. The other end 22 of the coil spring 20 is connected to the rotor body 60 by inserting the end 22 into a passage in the rotor body 60.

FIG. 4 illustrates the relationship of the extended portion 11 of the retainer plate 10 to an internal shoulder 51 of the housing 50. It also shows one end 21 of the spring extending through the retainer plate 10 and a portion of the tab 12 that extends in the space between the coil spring 20 and the rotor body (not shown). To prevent the first winding of the spring 20 from compressing inwardly the tab 12 is located between 45 degrees to 145 degrees (preferably 90) from the extended portion 11 of the plate 10.

FIG. 5 illustrates an enlarged view of the ignition switch shown in FIGS. 3 and 4. The rotor body 60 includes a recessed portion 62 having an inner wall 65 and an outer wall 64 between which is located a spring 20. One end 22 of the spring 20 is connected to the rotor body 60 by inserting the end 22 into a passage in the rotor body 60. The other end (not shown) is connected to the retainer plate 10 is shown in FIGS. 3 and 4. Therefore, when the rotor body 60 is rotated relative to the retainer plate 10 in one direction the coil spring 20 will begin to wind providing a force in the opposite direction.

In operation the ignition switch operates as follows. When the ignition switch is rotated into the ON position electrical contacts 90 engage the proper circuitry to apply electrical power. When the switch is moved from the OFF to the ON position the extended portion 11 of the retainer plate engages the internal shoulder 51 of the housing 50. During movement from the OFF to the ON position there is no relative movement between the retainer plate 10 and the rotor body 60 that would cause the spring 20 to be wound. However, when the ignition switch is moved from the ON position to the START position relative movement between the retainer plate 10 and the rotor body 60 occurs to wind the spring 20. This occurs because the extended portion 11 of the retainer plate has engaged the shoulder 51 of the housing so that when the shaft 70 is rotated further in the same direction the rotor body 60 will rotate. This relative movement between the retainer plate 10 and the rotor body 60 causes the spring 20 to wind. Upon winding the coils of the spring move radially inward. However, the tab 12 on the retainer plate 10 prevents any portion of the spring 20 from wedging between the inner wall 65 of the rotor body and the retainer plate 10 and allows the spring to apply a force to the rotor body in the opposite direction of the operator movement. Accordingly, when the operator removes his hand from the ignition switch the force of the spring 20 returns the rotor body 60 back to the ON position.

While a preferred embodiment of the invention has been disclosed it will be apparent to those skilled in the art that changes may be made to the invention as set forth in the pending claims and, in some instances certain features of the invention may be used to advantage without the use of other features. For example, although an aircraft ignition switch has been discussed the invention is applicable to all spring return type switches. Accordingly, it is intended that the illustrative and descriptive materials herein be used to illustrate the principals of the invention and not to limit the scope thereof.

What is claimed is:

1. In combination with a switch of the type having: a housing which includes an internal shoulder; a rotor which includes a central passage and an annular recess located at one end and spaced from said central passage, said recess including a inner wall and an outer wall; means for mounting said rotor for radial movement within said housing, said means including a shaft disposed in said rotor central passage and connected to said rotor; at least one electrical contact mounted on the other opposite end of said rotor; a coil spring mounted in the annular recess of said rotor; means for attaching one end of said spring to said rotor; and a plate connected to the other opposite end of said spring, said plate having an extended portion adapted to engage said housing shoulder when said rotor is rotated a predetermined distance, the improvement wherein:

the retainer plate includes a tab projecting from the surface of said plate in the direction of said spring and located adjacent the inner diameter of the first winding of said spring, whereby when said rotor is rotated a predetermined distance the extended portion of said plate engages said housing shoulder and further rotation of said rotor causes said rotor to wind said spring which compresses inwardly, further causing the tab on said plate to engage the first winding of said spring as it compresses to prevent the first winding of said spring from engaging the inner wall of said recess.

2. The combination recited in claim 1 wherein the tab projecting from the surface of said plate is located between 45 degrees and 145 degrees from the extended portion of said plate.

* * * * *